United States Patent
Ando

(10) Patent No.: US 11,721,086 B2
(45) Date of Patent: Aug. 8, 2023

(54) IMAGE PROCESSING SYSTEM AND IMAGE PROCESSING METHOD

(71) Applicant: OLYMPUS CORPORATION, Tokyo (JP)

(72) Inventor: Jun Ando, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 85 days.

(21) Appl. No.: 17/174,391

(22) Filed: Feb. 12, 2021

(65) Prior Publication Data

US 2021/0166066 A1 Jun. 3, 2021

Related U.S. Application Data

(63) Continuation of application No. PCT/JP2019/000831, filed on Jan. 15, 2019.

(51) Int. Cl.

| | |
|---|---|
| *G06V 10/75* | (2022.01) |
| *G06T 3/40* | (2006.01) |
| *G06T 5/00* | (2006.01) |
| *G06V 10/764* | (2022.01) |
| *G06V 10/774* | (2022.01) |
| *G06V 10/82* | (2022.01) |

(52) U.S. Cl.
CPC .............. *G06V 10/758* (2022.01); *G06T 3/40* (2013.01); *G06T 5/002* (2013.01); *G06T 5/008* (2013.01); *G06V 10/764* (2022.01); *G06V 10/7747* (2022.01); *G06V 10/82* (2022.01); *G06T 2207/20081* (2013.01); *G06T 2207/30004* (2013.01)

(58) Field of Classification Search
None
See application file for complete search history.

(56) References Cited

U.S. PATENT DOCUMENTS 9,602,685 B2   3/2017  Miyauchi et al.
9,959,615 B2 * 5/2018  Liang ................... G06V 10/454
(Continued)

FOREIGN PATENT DOCUMENTS

| CN | 106570515 A | 3/2017 |
|---|---|---|
| JP | 2016-38732 A | 3/2016 |

OTHER PUBLICATIONS

International Search Report dated Apr. 16, 2019 issued in PCT/JP2019/000831.

(Continued)

*Primary Examiner* — Randolph I Chu
(74) *Attorney, Agent, or Firm* — Scully, Scott, Murphy & Presser, P.C.

(57) ABSTRACT

An image processing system includes a memory storing a training image set and a reference image set, and a processor including hardware. The processor is configured to: generate an augmented image set by applying data augmentation to images included in the training image set; and determine an augmentation parameter based on a similarity between an augmentation feature statistic and a reference feature statistic, the augmentation feature statistic being a statistic of a feature of a recognition target calculated based on the augmented image set, the reference feature statistic being a statistic of a feature of the recognition target calculated based on the reference image set.

15 Claims, 10 Drawing Sheets

(56) References Cited

U.S. PATENT DOCUMENTS

| | | | |
|---|---|---|---|
| 11,100,685 B2* | 8/2021 | Liang | G16H 50/20 |
| 11,276,164 B2* | 3/2022 | Zhao | G06K 9/6267 |
| 11,348,239 B2* | 5/2022 | Yip | G06T 11/00 |
| 2018/0314943 A1* | 11/2018 | Liang | G06V 10/764 |
| 2019/0122073 A1* | 4/2019 | Ozdemir | A61B 5/7267 |
| 2019/0332896 A1* | 10/2019 | Liang | G06V 10/764 |
| 2019/0370972 A1* | 12/2019 | Bagci | G06N 3/084 |
| 2020/0065992 A1* | 2/2020 | Sung | G06V 10/30 |
| 2021/0133964 A1* | 5/2021 | Sachdev | G06T 5/006 |
| 2021/0279881 A1* | 9/2021 | Bagci | G06V 10/26 |

OTHER PUBLICATIONS

Enokibori, Yu, "A study of Data Augmentation to Build High Performance DNN for In-bed Posture Classification", IPSJ SIG technical reports. ASD 2017-ASD-009 [online], Aug. 17, 2017, pp. 1-8, Internet <URL: https://ipsj.ixsq.nii.ac.jp/ej/?action=repository_uri&item_id=1830998file_id=l&file_no=1>, cited in ISR.

Liu, Qinghui, "Deep Learning Applied to Automatic Polyp Detection in Colonoscopy Images", University College of Southeast Norway, Faculty of Technology and Maritime Sciences, Master Thesis in System Engineering With Embedded Systems, Kongsberg Department of Engineering (May 19, 2017).

* cited by examiner

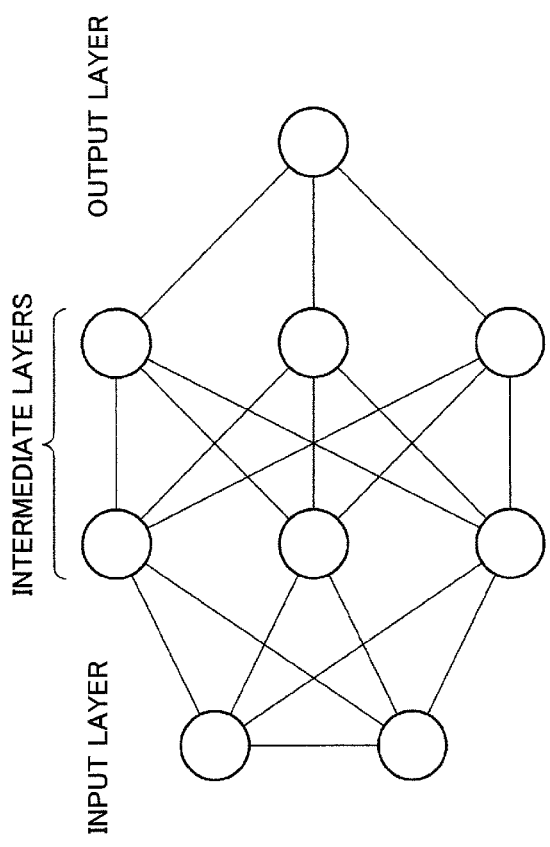
FIG. 8A
FIG. 8B

IMAGE PROCESSING SYSTEM AND IMAGE PROCESSING METHOD

CROSS REFERENCE TO RELATED APPLICATION

This application is a continuation of International Patent Application No. PCT/JP2019/000831, having an international filing date of Jan. 15, 2019, which designated the United States, the entirety of which is incorporated herein by reference.

BACKGROUND

As the methods for detecting a recognition target from an image, a method using machine learning has been known. Also, in a training process for generating a trained model, a method employing data augmentation on training data to increase accuracy has been known as well. For example, Japanese Unexamined Patent Application Publication No. 2016-038732 discloses a method of generating an additional image through a correction process on training images using image correction parameters.

Despite the fact that detection of a recognition target with a given feature is of high importance, there may be a case where a training image set does not include a sufficient number of images containing the recognition target with that feature. The feature may be, for example, the size of the recognition target in an image, though other various features are possible. In such a case, it is effective to increase the number or ratio of images including the recognition target with such a desired feature by applying the above data augmentation.

SUMMARY

In accordance with one of some aspect, there is provided an image processing system comprising:

a memory storing a training image set and a reference image set; and a processor including hardware, wherein the processor is configured to: generate an augmented image set by applying data augmentation to images included in the training image set, the data augmentation being determined based on a candidate augmentation parameter that is a candidate for an augmentation parameter; calculate an augmentation feature statistic based on the augmented image set, the augmentation feature statistic being a statistic of a feature of a recognition target; calculate a reference feature statistic based on the reference image set, the reference feature statistic being a statistic of a feature of the recognition target; and determine the augmentation parameter based on a similarity between the augmentation feature statistic and the reference feature statistic.

In accordance with one of some aspect, there is provided an image processing system comprising: a memory storing a trained model; and a processor including hardware, wherein the processor is configured to detect a recognition target in an acquired applied image by performing processing thereon based on the trained model, the trained model is trained using an augmented image set generated by applying data augmentation to a training image set, the data augmentation being determined based on an augmentation parameter, and the augmentation parameter is determined such that a feature of the recognition target in the augmented image set is close to a feature of the recognition target in a reference image set, the reference image set being a collection of images acquired in environments similar to an environment in which the applied image is acquired.

In accordance with one of some aspect, there is provided an image processing method comprising: acquiring a training image set; generating an augmented image set by applying data augmentation to images included in the training image set, the data augmentation being determined based on a candidate augmentation parameter that is a candidate for an augmentation parameter; calculating an augmentation feature statistic based on the augmented image set, the augmentation feature statistic being a statistic of a feature of a recognition target; acquiring a reference image set; calculating a reference feature statistic based on the reference image set, the reference feature statistic being a statistic of a feature of the recognition target; and determining the augmentation parameter based on a similarity between the augmentation feature statistic and the reference feature statistic.

BRIEF DESCRIPTION OF THE DRAWINGS

FIGS. 8A and 8B explain a neural network as an example of a trained model.

DESCRIPTION OF EXEMPLARY EMBODIMENTS

Figure 1A:
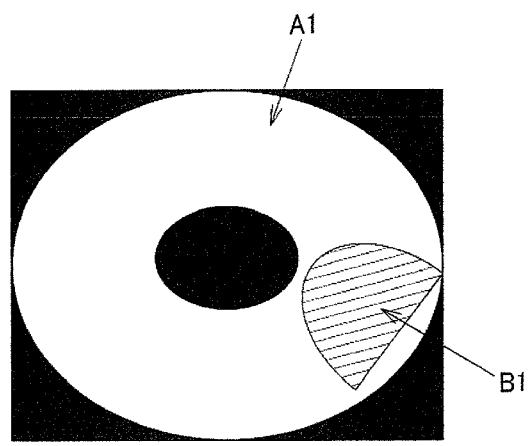
FIGS. 1A and 1B illustrate an example of images included in a training image set.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Method of an Exemplary Embodiment

A method of detecting an object using machine learning has widely been known. For example, a detection device detects a recognition target from an image using a trained model generated by machine learning. For example, the detection device is an endoscope apparatus and detects a recognition target, such as a polyp, in examinations and diagnosis assistance using an endoscope. In this case, a training process for generating a trained model is performed based on a training image set including polyps.

It is important to detect a polyp as quickly as possible once it appears in a field of view of the endoscope. This is because a recognition target within an image that captures an interior of a tubular structure, such as an endoscope image, may disappear from the field of view soon after its appearance, due to operation of the endoscope or variability in the interior of the structure. Quick detection of a polyp helps reduce oversight. Meanwhile, a polyp that remains in the field of view for a certain period after its appearance can be relatively easily identified and observed by the user. The user as referred to herein is a physician, for example. Polyp detection is performed for assisting the user in his/her examinations and other operations, and thus merely detecting a polyp that can be identified by the user him/herself does not provide a good assistance to the user. In other words, quick polyp detection is important also in view of informing the user of a polyp that is not recognized by the user.

To create a trained model for detection of polyps, training is performed using a training image set that is a collection of images including polyps. The learning or training as referred to herein is, more specifically, supervised learning, and each image included in the training image set is associated with information for identifying a position of the polyp. For example, the information for identifying a position of the polyp is mask data in which a pixel included in a polyp region is assigned a first value and a pixel not included in the polyp region is assigned a second value different from the first value.

Figure 1B:
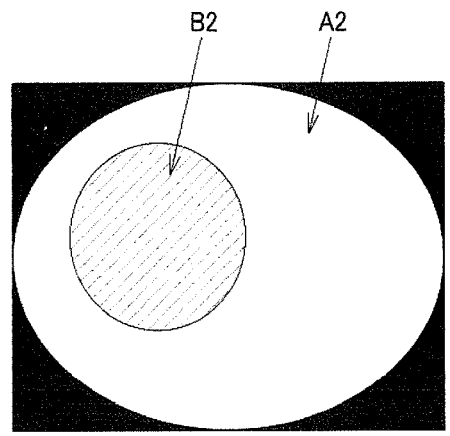

FIGS. 1A and 1B illustrate an example of images included a training image set. Each image acquired for the training image set is one that captures an interior of a tubular (luminal) object. For example, the luminal object is a digestive organ, more specifically the large intestine. For example, FIG. 1A illustrates an image captured with an optical axis of an imaging optical system coinciding with a longitudinal direction of the lumen. FIG. 1B illustrates an image captured with the imaging optical system facing a wall of the lumen. In FIGS. 1A and 1B, regions A1 and A2 correspond to an inner wall of the large intestine, and regions B1 and B2 are polyp regions.

The training image set is often acquired by extracting images capturing polyps from endoscopic medical images. For this reason, the training image set includes a large proportion of images including polyps that are clearly captured and suitable for observation. Specifically, as illustrated in FIGS. 1A and 1B, polyps tend to be captured as relatively large, bright and high-contrast images. On the other hand, a polyp immediately after its appearance, of which detection is highly important, is positioned in a peripheral area of an image and is thus likely to be captured unclearly. Specifically, the polyp immediately after its appearance is small, dark and blurry as compared to what is shown in FIGS. 1A and 1B.

The training image set has an advantage that both the number of images and the variety are large. Specifically, the training image set can include images produced by capturing various portions in many subjects using a variety of imaging devices each having different characteristics regarding light sources, image sensors, and other factors. However, due to differences between features of polyps included in the training image set and those of polyps in a situation which is desired to detect, directly using the training image set for training may be ineffective in improving detection accuracy.

Figure 2A:
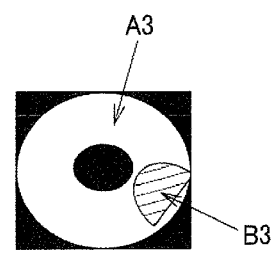
FIGS. 2A and 2B illustrate an example of images included in an augmented image set.
Figure 2B:
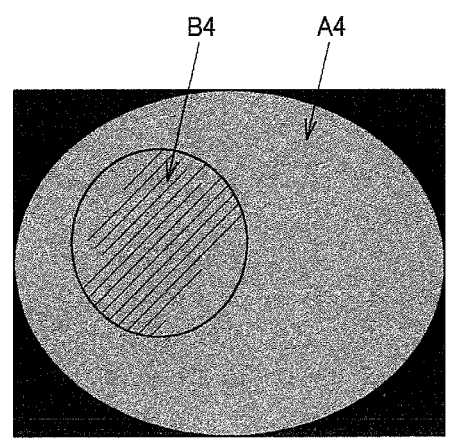

In this regard, a method of generating an augmented image set by applying data augmentation to a training image set has widely been known. FIGS. 2A and 2B illustrate an example of images included in an augmented image set. For example, FIG. 2A illustrates an image that is obtained by reducing the size of the image in FIG. 1A through an image resizing process. FIG. 2B illustrates an image that is obtained by reducing the brightness of the image in FIG. 1B through a brightness correction process. In FIGS. 2A and 2B, regions A3 and A4 correspond to an inner wall of the large intestine, and regions B3 and B4 are polyp regions. The augmented image set generated in this manner includes a larger proportion of images that capture polyps unclearly, as compared to the training image set. In other words, data augmentation enables adjustment to features of polyps, such as the size, brightness, and blur amount thereof.

However, data augmentation involves difficulty in setting an appropriate augmentation parameter. For example, insufficient size reduction will result in insufficient increase in detection accuracy for small polyps. On the other hand, excessive size reduction may result in training based on images that include polyps too small to be realistic in actual environments, which may in fact decrease detection accuracy. Since the method disclosed in Japanese Unexamined Patent Application Publication No. 2016-038732 is a method for determining parameters based on characteristics of a device for acquiring images, it would be difficult for this method to determine appropriate parameters in the cases contemplated in the exemplary embodiment.

In view of the above, the exemplary embodiment utilizes a reference image set. The reference image set is a collection of images that are acquired in an environment similar to the one in which a process of detecting a recognition target is performed. More specifically, the reference image set is an image set that includes images corresponding frames including a frame in which a polyp has appeared in the field of view of the endoscope and frames within a predetermined time period after that frame.

Figure 3A:
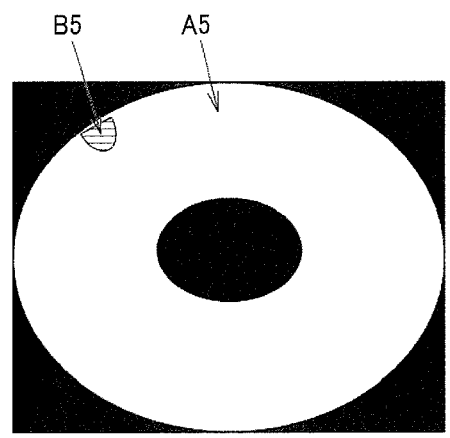
FIGS. 3A and 3B illustrate an example of images included in a reference image set.
Figure 3B:
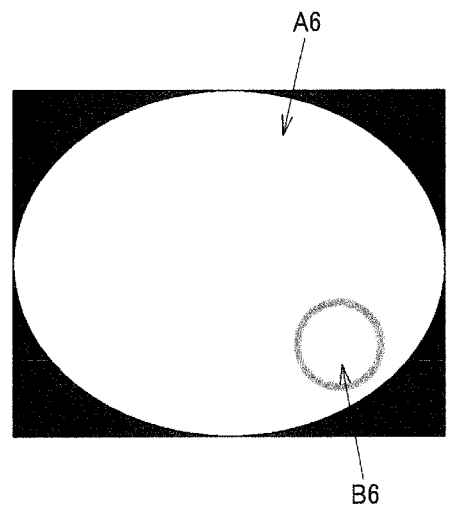

FIGS. 3A and 3B illustrate an example of images included in the reference image set. In FIGS. 3A and 3B, regions A5 and A6 correspond to an inner wall of the large intestine, and regions B5 and B6 are polyp regions. The reference image set includes many images that capture polyps unclearly. For example, the polyp in the image in FIG. 3A is smaller in size than the polyps in the images in FIGS. 1A and 1B. The image in FIG. 3B, in which a boundary of the polyp is captured unclearly, has a larger blur amount than the images in FIGS. 1A and 1B. The reference image set is advantageous in that statistical features of polyps contained therein match the actual environments.

Nonetheless, as has been explained for the training image set, many of the images that can be collected as polyp images are those clearly capturing polyps. Hence, the number and variety of images included in the reference image set is small as compared to the training image set, and thus it is not easy to increase detection accuracy by using the reference image set as input for machine learning.

Figure 4:
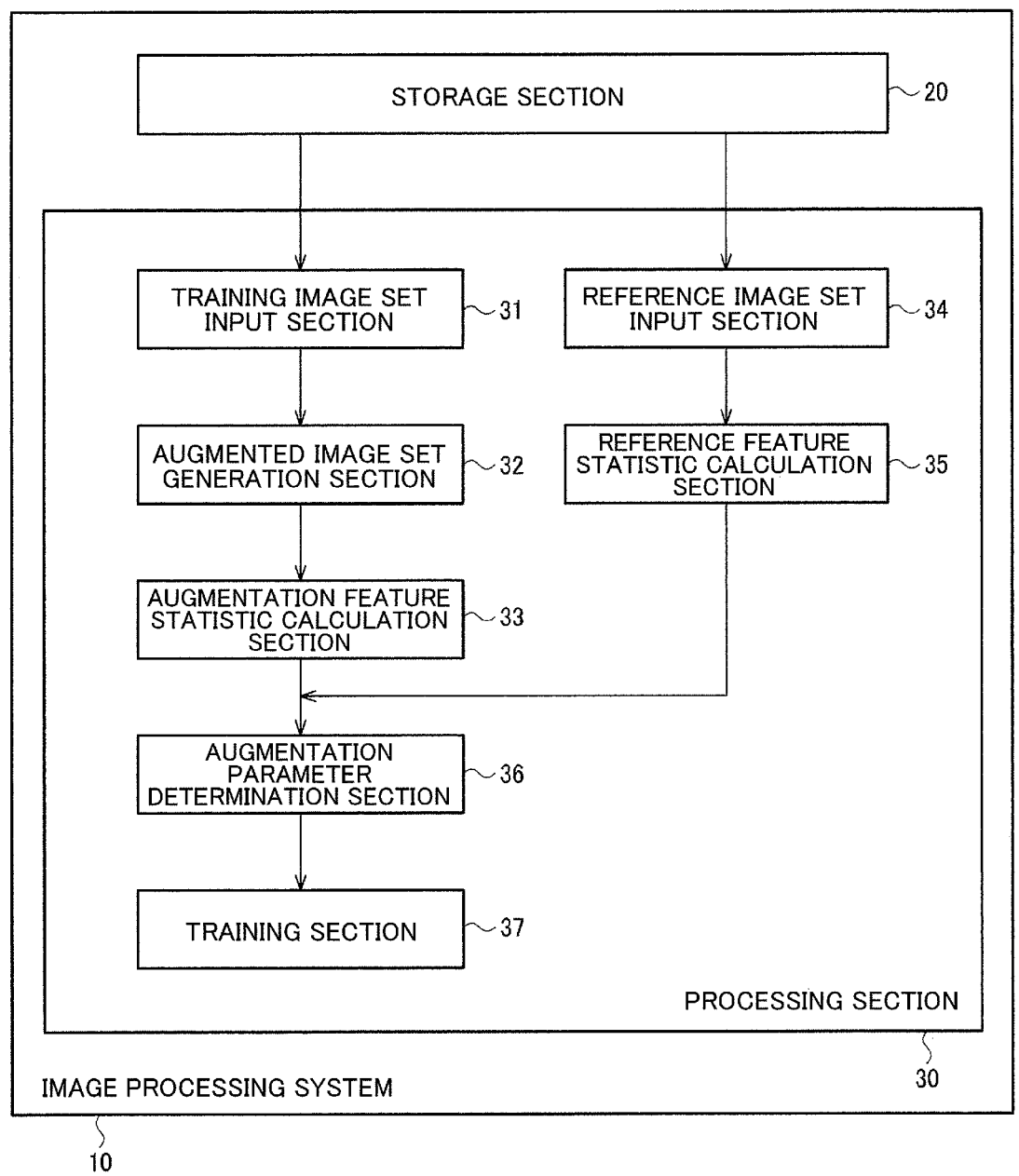
FIG. 4 illustrates a configuration example of an image processing system.

Therefore, the exemplary embodiment uses the reference image set for determination of an augmentation parameter. As shown in FIG. 4, an image processing system 10 in accordance with the exemplary embodiment includes a storage section 20 that stores the training image set and the reference image set, and a processing section 30 that determines an augmentation parameter used for data augmentation. The processing section 30 generates an augmented image set by applying data augmentation to the images included in the training image set, the data augmentation being determined based on a candidate augmentation parameter that is a candidate for an augmentation parameter. Based on the augmented image set, the processing section 30 calculates an augmentation feature statistic that is a statistic of a feature of a recognition target. Likewise, based on the reference image set, the processing section 30 calculates a reference feature statistic that is a statistic of a feature of the recognition target. The processing section 30 determines the augmentation parameter based on a similarity between the augmentation feature statistic and the reference feature statistic. Examples of the feature of the recognition target include the size, brightness, and blur amount thereof. Each of the augmented image set and the reference image set includes a plurality of images, and each of these images includes one or more recognition targets. This means that the feature of the recognition target in the augmented image set is not a single value but is an aggregation of values as many as the number of recognition targets. This holds for the reference image set. The feature statistic is a statistic obtained based on the plurality of values representing the feature. The use of the feature statistic enables appropriate comparison between the feature of the recognition target included in the augmented image set and the feature of the recognition target included in the reference image set.

As such, the method of the exemplary embodiment generates an interim augmented image set using a candidate augmentation parameter, and then compares the feature statistic based on the augmented image set with the feature statistic based on the reference image set. In other words, the processing section 30 generates a candidate augmented image set using a candidate augmentation parameter, calculates a candidate augmentation feature statistic based on the candidate augmented image set, and compares the candidate augmentation feature statistic and a reference feature statistic. The processing section 30 determines an augmentation parameter for data augmentation such that a feature statistic of the recognition target included in an augmented image set generated by the data augmentation is close to a feature statistic of the recognition target included in the reference image set. Various options are available for specific processes, as will be described with reference to FIGS. 5 and 9. This method enables appropriate augmentation parameter setting that takes into account the environments in which the process of detecting the recognition target is performed. This method can also improve recognition performance by performing the training for image recognition processing using the augmented image set generated by an appropriate augmentation parameter.

The reference image set includes images corresponding to frames including a frame in which a recognition target has appeared and frames within a predetermined time period after that frame. The predetermined time period is preferably about 10 seconds, and more preferably one or a few seconds. The predetermined time period may, however, be modified in various ways. The reference image set may include images corresponding to all frames within the predetermined time period. When the predetermined time period is t seconds and the imaging frame rate is f frames/second, the reference image set includes t×f images for each appearance of a polyp. Furthermore, the reference image set may be a set of images extracted partially from the images corresponding to the frames within the predetermined time period This method allows utilization of an image group appropriately reflecting the feature of the recognition target immediately after its appearance, as the reference image set. This method can also add the t×f images at the maximum to the reference image set by identifying one frame in which the recognition target has appeared. This eliminates the need for individually identifying images to be included in the reference image set, reducing the burden in preparing the reference image set.

The reference image set may include images that capture an interior of a tubular structure. The tubular structure may be a digestive organ as described above, but is not limited thereto. For example, the tubular structure may be an industrial pipe or the like. Determination of an augmentation parameter using this reference image set can improve detection accuracy for a recognition target positioned inside a tubular structure. In particular, a tubular structure is more likely to allow the recognition target to disappear from the field of view due to relative movement between the imaging section and the object, as compared to planar structures. Improving the detection accuracy for the recognition target helps reduce oversight.

The recognition target in the images included in the reference image set may be an object of interest positioned in a peripheral area of each image. Determination of an augmentation parameter using this reference image set can improve detection accuracy for an object of interest captured in a peripheral area of an image. It is thus possible, for example, to improve detection accuracy for an object of interest immediately after its appearance and to reduce oversight.

It should be noted that the method for generating the reference image set, the features of the recognition target in the images included in the reference image set, the kind of the object, and other particulars may be modified in various ways besides the aforementioned ones. For example, assume a case where night-time detection of a given recognition target is required, but daytime images are dominant in the images collectable for the training image. In this case, an augmented image set is generated by applying, to the training image set, data augmentation to increase the number of images with low brightness. In so doing, an augmentation parameter is determined based on a reference image set that consists of images captured during night-time. This allows the augmented image set to include a large number of recognition targets with low brightness like those captured during night-time, improving the night-time detection accuracy for the recognition target.

Below a description will be given of the case where the recognition target is a polyp originating in a tubular biological organ and use is made of a reference image set that includes images corresponding to frames including a frame in which a polyp has appeared and frames within a predetermined time period after that frame. As mentioned earlier, however, the method of the exemplary embodiment is not limited to this. The method of the exemplary embodiment may be applied to various cases as far as satisfying both of a condition that an augmentation parameter is determined such that the feature of the recognition target in the augmented image set is close to the feature of the recognition target in the reference image set, and a condition that the reference image set is an image set reflecting the feature of the recognition target in actual detection environments.

2. System Configuration Example

Details of the configuration of the image processing system 10 shown in FIG. 4 will be described. The image processing system 10 includes the storage section 20 and the processing section 30.

The processing section 30 is configured with the following hardware. The hardware may include at least one of a digital signal processing circuit and an analog signal processing circuit. For example, the hardware may be composed of one or more circuit devices mounted on a circuit board or may be composed of one or more circuit elements. The one or more circuit devices is an integrated circuit (IC), for example. The one or more circuit elements is a resistor or a capacitor, for example.

Alternatively, the processing section 30 may be implemented by the following processor. The image processing system 10 of the exemplary embodiment includes a memory storing information and a processor configured to operate based on the information stored in the memory. The information may include programs and various data, for example. The processor includes hardware. The processor may be any of various processors including a central processing unit (CPU), a graphics processing unit (GPU) and a digital signal processor (DSP). The memory may be a semiconductor memory such as a static random-access memory (SRAM) and a dynamic random-access memory (DRAM) or may be a register. The memory may also be a magnetic storage device such as a hard disk device (HDD) or an optical storage device such as an optical disk device. For example, the memory stores computer-readable instructions, and functions of the respective sections in the processing section 30 are implemented as the processes by the processor executing the instructions. These instructions may be an instruction set included in a program or may be instructions that cause operations of the hardware circuit included in the processor.

The storage section 20 stores various information including data and programs. For example, the processing section 30 operates with the storage section 20 as a working area. The storage section 20 may be a semiconductor memory, a register, a magnetic storage device, or an optical storage device.

As shown in FIG. 4, the processing section 30 includes a training image set input section 31, an augmented image set generation section 32, an augmentation feature statistic calculation section 33, a reference image set input section 34, a reference feature statistic calculation section 35, an augmentation parameter determination section 36, and a training section 37. It should be noted that the configuration of the image processing system 10 and the processing section 30 is not limited to that shown in FIG. 4, and various modifications are possible including removal of some of the above components and addition of other components.

The training image set input section 31 receives input of a training image set. The training image set input section 31 is, for example, an interface for reading data from the storage section 20. Alternatively, the training image set input section 31 may be a communication interface for receiving a training image set from an external device via a network and writing the received training image set into the storage section 20.

The augmented image set generation section 32 generates an augmented image set by applying data augmentation determined by an augmentation parameter to each image included in the training image set. Note that the augmented image set generated here is not necessarily used in a training process in the training section 37 and may be discarded depending on processing by the augmentation parameter determination section 36. In other words, and in a strict sense, the augmentation parameter used here is a candidate augmentation parameter.

The augmentation feature statistic calculation section 33 calculates, from the augmented image set, an augmentation feature statistic that is a statistic of a feature of the recognition target. Examples of the feature of the recognition target include the size, brightness, and blur amount thereof. Examples of the statistic include a frequency distribution. Details of the feature statistic will be given later.

The reference image set input section 34 receives input of a reference image set. The reference image set input section 34 may be implemented as an interface of any of various kinds, similarly to the training image set input section 31. The reference feature statistic calculation section 35 calculates, from the reference image set, a reference feature statistic that is a statistic of the feature of the recognition target. The processing to calculate the reference feature statistic is similar to the processing to calculate the augmentation feature statistic.

The augmentation parameter determination section 36 determines an augmentation parameter based on a similarity between the augmentation feature statistic and the reference feature statistic. The training section 37 is trained for the image recognition processing using an augmented image set corresponding to the thus determined augmentation parameter.

FIG. 4 illustrates the case where the image processing system 10 includes the training section 37. In other words, through machine learning based on the augmented image set generated using the determined augmentation parameter, the processing section 30 generates a trained model to detect recognition targets in applied images. The applied images refer to images subjected to the processing to detect recognition targets, namely input images to a detection device (or inference device/recognition device).

This configuration allows the same image processing system 10 to perform the generation of the augmented image set for training and also to perform the training using this augmented image set. For example, the augmentation parameter determination and the training process can be performed in a single electronic apparatus. Having said that, the image processing system 10 may be composed of a plurality of devices such that the generation of the augmented image set and the training process are performed in difference devices. Also, at least one of the generation of the augmented image set and the training process may be implemented by distributed processing on a plurality of devices.

3. Processing Details

Figure 5:
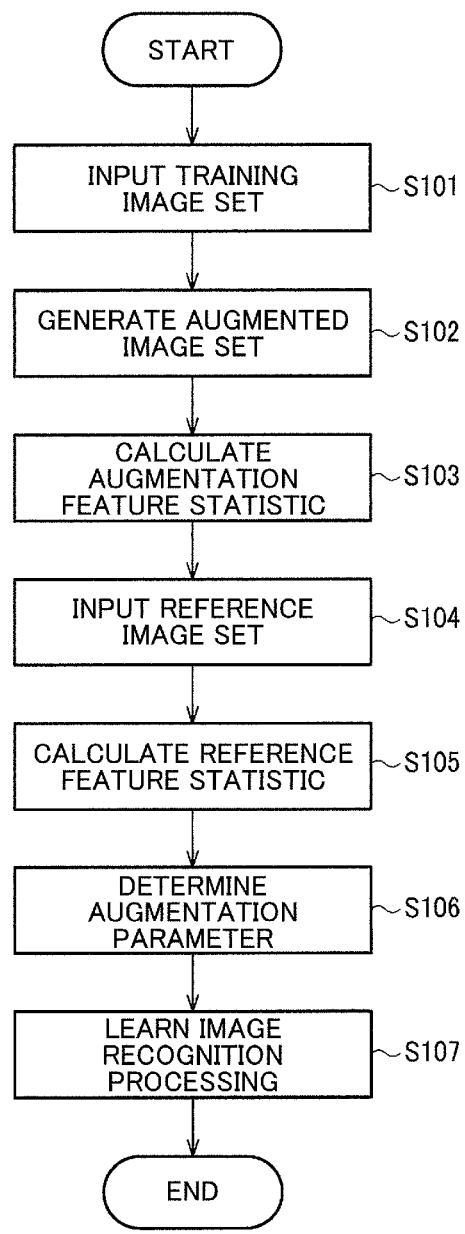
FIG. 5 is a flowchart of processing in accordance with an exemplary embodiment.

FIG. 5 is a flowchart of the processing in accordance with the exemplary embodiment. At the start of this processing, the training image set input section 31 receives input of a training image set (step S101). Then, the augmented image set generation section 32 generates augmented image sets by applying data augmentation to the training image set (step S102).

For data augmentation, the augmented image set generation section 32 performs an image resizing process, a brightness correction process, and a smoothing process. In this case, an augmentation parameter includes upper and lower limits of an image resizing rate, upper and lower limits of brightness correction, and upper and lower limits of the smoothing process. Here, the upper limit of the image resizing rate is defined as a limit on the maximum image size, and the lower limit of the image resizing rate is defined as a limit on the minimum image size. The upper limit of the brightness correction is defined as a limit on the highest brightness, and the lower limit of the brightness correction is defined as a limit on the lowest brightness. The upper limit of the smoothing process is defined as a limit on the highest smoothing level, and the lower limit of the smoothing process is defined as a limit on the lowest smoothing level. Not all of the image resizing process, the brightness correction process, and the smoothing process are essential, and one or more of them may be omitted. Also, the data augmentation may additionally include other processing, such as image rotation.

For example, assume that the image resizing rate can set $N_A$ values between the lower and upper limits. In the case where, for example, the lower and upper limits of the image resizing rate are respectively 0.7 times and 1.2 times and the rate can be set in increments of 0.1 time, $N_A=6$. Likewise, assume that the brightness correction can set $N_B$ parameter values between the lower and upper limits, and the smoothing process can set $N_C$ parameter values between the lower and upper limits. In this case, data augmentation on one image included in the training image set can produce a maximum of $N_A \times N_B \times N_C$ images. In other words, the augmented image set generation section 32 can generate an augmented image set that includes $N_A \times N_B \times N_C$ times as many images as the number of images included in the training image set. However, an excessive number of images in the augmented image set increases a load on the training process. Hence, the augmented image set generation section 32 may perform data augmentation for some of the $N_A \times N_B \times N_C$ combinations, rather than for all of the $N_A \times N_B \times N_C$ combinations, to reduce the number of images included in the augmented image set.

The brightness correction process is a gamma correction process, for example. The augmented image set generation section 32 converts RGB pixel values into an HSV color space, based on the following expression (1). H represents hue, S represents chroma (i.e., saturation), and V represents brightness (i.e., value). In the following expression (1), R, G, and B represent red, green, and blue pixel values, respectively. Max represents a maximum value among the RGB pixel values, and Min represents a minimum value among the RGB pixel values. Next, the augmented image set generation section 32 performs a gamma correction process on the brightness V based on the following expression (2). In the following expression (2), V' represents brightness after gamma correction. The brightness keeps its original value when γ=1, whereas the brightness decreases with an increase in γ, and increases with a decrease in γ. The augmentation parameter is more specifically the upper and lower limits of γ. After the gamma correction process, the augmented image set generation section 32 converts the HSV color space back into RGB pixel values based on the following expression (3). In the following expression (3), R', G', and B' respectively represent red, green, and blue pixel values after the reconversion. Also, floor(x) represents the largest integer not more than x.

$$H = \begin{cases} \frac{G-B}{\text{Max} - \text{Min}} \times 60 & (\text{Max} = R) \\ \frac{B-R}{\text{Max} - \text{Min}} \times 60 + 120 & (\text{Max} = G) \\ \frac{R-G}{\text{Max} - \text{Min}} \times 60 + 240 & (\text{Max} = B) \end{cases} \quad (1)$$

$$S = \frac{\text{Max} - \text{Min}}{\text{Max}}$$

$$V = \text{Max}$$

$$V' = \left(\frac{V}{255}\right)^{\gamma} \times 255 \quad (2)$$

$$R' = \begin{cases} V' & (h=0) \\ q & (h=1) \\ p & (h=2) \\ p & (h=3) \\ t & (h=4) \\ V' & (h=5) \end{cases} \quad G' = \begin{cases} t & (h=0) \\ V' & (h=1) \\ V' & (h=2) \\ q & (h=3) \\ p & (h=4) \\ p & (h=5) \end{cases} \quad B' = \begin{cases} p & (h=0) \\ p & (h=1) \\ t & (h=2) \\ V' & (h=3) \\ V' & (h=4) \\ q & (h=5) \end{cases} \quad (3)$$

$$h = \text{floor}\left(\frac{H}{60}\right) \quad f = \frac{H}{60} - h$$

$$p = V' \times (1-S) \quad q = V' \times (1 - S \times f) \quad t = V' \times (1 - S \times (1-f))$$

The smoothing process is a filter process using a smoothing filter, for example. The smoothing filter is, for example, a filter with variable smoothing levels, in which the upper and lower limits of the parameter value in the smoothing process are upper and lower limits of the smoothing level of the smoothing filter. The smoothing level is, for example, a value of σ in a Gaussian filter and increases with an increase in σ. Various smoothing filters and various parameters for determining their smoothing level are known and generally applicable to the exemplary embodiment. Alternatively, the smoothing filter may be, for example, a filter with a fixed smoothing level, in which the upper and lower limits of the parameter value in the smoothing process may be upper and lower limits of how many times the smoothing filter is applied. In this case, a smaller number of filter applications means a lower smoothing level. For example, the smoothing level can be adjusted by how many times a Gaussian filter with a fixed value of σ is applied.

At step S102 in FIG. 5, the augmented image set generation section 32 generates a plurality of augmented image sets based on a plurality of augmentation parameters having different parameter values. Here, each augmentation parameter is a candidate augmentation parameter. For example, a first augmentation parameter and a second augmentation parameter differ in at least one of the upper limit of the image resizing rate, the lower limit of the image resizing rate, the upper limit of the brightness correction, the lower limit of the brightness correction, the upper limit of the smoothing process, and the lower limit of the smoothing process.

In the case of detecting polyps, data augmentation is performed to increase the number of images in which polyps are captured as small, dark, and blurry images. Hence, it is important to appropriately determine the limit of reducing the polyp size, the limit of darkening the polyps, and the limit of increasing the blur amount of the polyps. That is, the first augmentation parameter and the second augmentation parameter differ in at least one of the lower limit of the image resizing rate, the lower limit of the brightness correction, and the upper limit of the smoothing process. In other words, the upper limit of the image resizing rate, the upper limit of the brightness correction, and the lower limit of the smoothing process may be fixed.

For example, assume the case where the upper limit of the image resizing rate is fixed at 1.2 times while the lower limit of the image resizing rate include three candidates of 0.5 times, 0.6 times, and 0.7 times. In this case, the augmented image set generation section 32 generates first to third augmented image sets by performing data augmentation using a first parameter defining the image resizing rate in a range of 0.5 to 1.2 times, data augmentation using a second parameter defining the image resizing rate in a range of 0.6 to 1.2 times, and data augmentation using a third parameter defining the image resizing rate in a range of 0.7 to 1.2 times. The same applies to the brightness correction process and the smoothing process; the augmented image set generation section 32 generates a plurality of augmented image sets by performing data augmentation using a plurality of augmentation parameters having different parameter values.

From each of the plurality of different augmented image sets, the augmentation feature statistic calculation section 33 calculates an augmentation feature statistic that is a feature statistic of the recognition target (step S103). The processing section 30 uses at least one of the size, brightness, and blur amount of the recognition target as the feature of the recognition target. This allows for determination of an augmentation parameter based on the appropriate feature. A conventional problem in the case of polyps resides in discrepancy between the size, brightness, and blur amount of polyps in the training image set and those in actual polyp detection environments. In this regard, determination of an augmentation parameter using the feature(s) based on the size, brightness, and/or blur amount can make the size, brightness, and blur amount of polyps in the augmented image set close to those in detection environments. That is, this method improves accuracy of the detection process based on the trained model.

The size of the recognition target is more specifically a number of pixels of the recognition target. The brightness of the recognition target can be obtained, for example, using the brightness V in the above expression (1). When, for example, one recognition target corresponds to a plurality of pixels, the brightness V is obtained for each pixel, and the plurality of thus obtained values of the brightness V is averaged to give the brightness of the recognition target. The blur amount of the recognition target is, for example, a contrast value. As an example, the augmentation feature statistic calculation section 33 applies a bandpass filter to each pixel of images included in the augmented image set, and calculates contrast values by accumulating the output values. The method for calculating the contrast values is not limited to one using the bandpass filter, and various known methods are generally applicable.

The augmented image set includes many images and thus many recognition targets. Hence, the size of the recognition target calculated from the augmented image set is not a single value but an aggregation of multiple values. To appropriately grasp the feature of the recognition target in the augmented image set, it is effective to use an overall trend in the multiple values. This holds for the brightness and blur amount of the recognition target.

In this regard, the processing section 30 uses at least one of a frequency distribution, a mean value, a variance, a maximum value, a minimum value, and a higher-order moment of the feature of the recognition target, as the feature statistic of the recognition target. As will be described later with reference to FIGS. 6 and 7, for example, the frequency distribution represents the number of recognition targets in each of a plurality of sections (bins) into which the feature is sorted by value. The mean value may be a simple mean, a weighted mean, a trimmed mean, or the like. Also, the maximum and minimum values are not necessarily simple maximum and simple minimum, but may be a maximum and a minimum obtained after exclusion of values extremely deviating from the mean value. The mean value is a first-order moment, and the variance is a second-order moment about the mean value. Third- or even higher-order moments are also widely known, and the higher-order moment as used here may generally include such third- or even higher-order moments.

The use of the statistic enables appropriate representation of the feature of the recognition target in the augmented image set. The use of the statistic also enables easy comparison with the feature of the recognition target in the reference image set. The augmentation feature statistic calculation section 33 obtains the augmentation feature statistic for each of the plurality of augmented image sets to calculate a plurality of augmentation feature statistics.

The reference image set input section 34 receives input of the reference image set (step S104). For example, in videos capturing an interior of tubular objects, such as endoscope images, the reference image set is composed only of images corresponding to frames including a frame in which the recognition target has appeared and frames within a predetermined time period after that frame. Hence, the reference image set contains many recognition targets that are small, dark, blurry and positioned in peripheral areas in the images.

From the reference image set, the reference feature statistic calculation section 35 calculates a reference feature statistic that is a statistic of the feature of the recognition target (step S105). The feature and the feature statistic of the recognition target as used here are the same as those used at step S103.

While FIG. 5 illustrates that step S104 follows steps S101-103, the processing is not limited to this order. The processing at steps S101-S103 and the processing at steps S104, S105 can be executed independently from each other, and, for example, may be executed in parallel.

The augmentation parameter determination section 36 then determines, as the augmentation parameter used for training for the image recognition processing, an augmentation parameter that corresponds to an augmentation feature statistic having the highest similarity to the reference feature statistic among the plurality of different augmentation feature statistics (step S106). In other words, from among the plurality of candidate augmentation parameters used to generate the augmented image sets at step S102, the augmentation parameter determination section 36 adopts the candidate augmentation parameter that is judged most appropriate, as the augmentation parameter for the training process.

Figure 6:
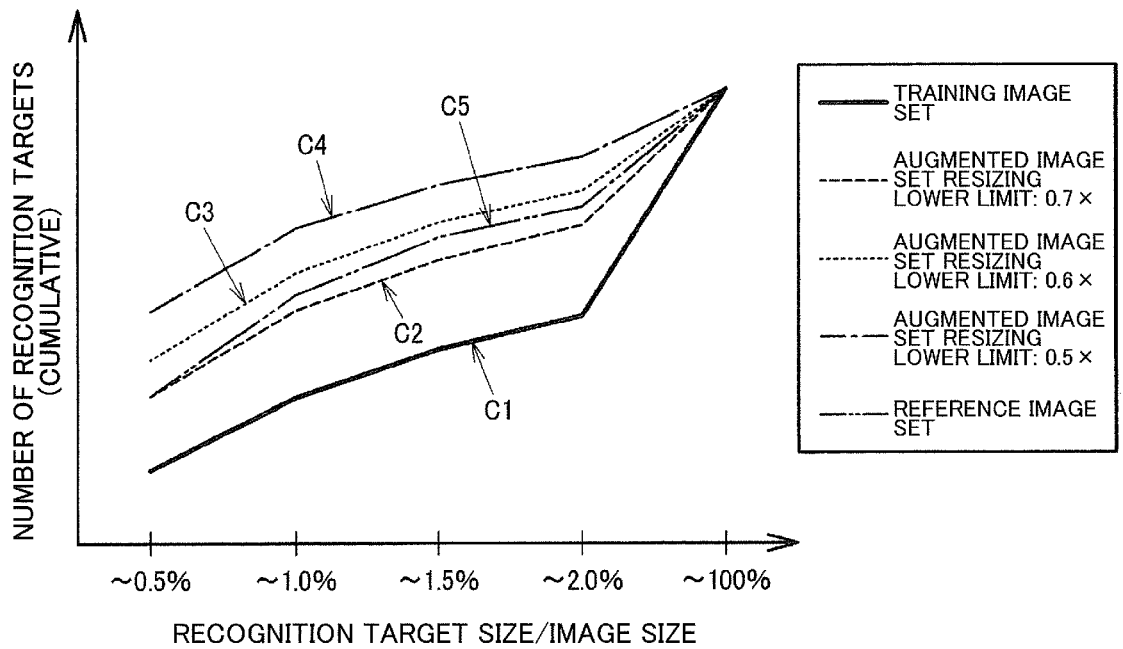
FIG. 6 illustrates an example of an augmentation feature statistic and a reference feature statistic.

FIG. 6 explains how the augmentation parameter defining the lower limit of the image resizing rate is determined based on comparison between the augmentation feature statistic and the reference feature statistic about the size of the recognition target. In FIG. 6, the horizontal axis represents the size of the recognition target, as expressed by its ratio to the image size. FIG. 6 shows a line chart for each image set that is drawn by connecting five values, i.e., the number of recognition targets with the size ratio of 0 to 0.5%, the number of recognition targets with the size ratio of 0 to 1.0%, the number of recognition targets with the size ratio of 0 to 1.5%, the number of recognition targets with the size ratio of 0 to 2.0%, and the number of recognition targets with the size ratio of 0 to 100%. This means that the vertical axis in FIG. 6 represents a cumulative number of recognition targets included in each image set. For judgment of a similarity between the charts, it is preferable to standardize the scales of the respective charts on the vertical axis. For example, the augmentation parameter determination section 36 unifies the total number of recognition targets to be processed across the image sets, or alternatively normalizes each image set based on the total number of recognition targets.

In FIG. 6, the line C1 represents a feature statistic of the training image set. It should be noted that the line C1 is shown for explanatory purposes and the processing section 30 may not necessarily calculate the feature statistic of the training image set. Since the training image set contains many large polyps, the number of recognition targets therein tends to be small in the four sections of 0 to 0.5%, 0 to 1.0%, 0 to 1.5%, and 0 to 2.0%.

In FIG. 6, the lines C2, C3, and C4 represent augmentation feature statistics of the augmented image sets that are generated by the augmentation parameters defining the lower limits of the resizing rate at 0.7 times, 0.6 times, and 0.5 times, respectively. Since all of these lower limits of the resizing rate are below 1.0 time, each augmented image set contains a larger number of recognition targets with the size ratio of not more than 2.0%, as compared to the training image set. For this reason, the lines C2, C3, and C4 are positioned above the line C1. Since a smaller lower limit increases the probability of containing a larger number of small polyps, the lines C2, C3, and C4 are arranged in this order from bottom to top along the vertical axis.

Assume that the line C5 represents the reference feature statistic of the reference image set. In this case, the line C3 is judged closest to the line C5 among the lines C2-C4. In other words, when the lower limit of the image resizing rate is 0.6 times, the feature frequency distribution of the augmented image set is closest to the feature frequency distribution of the reference image set. Hence, the augmentation parameter determination section 36 determines the lower limit of the image resizing rate to be 0.6 times.

Specific processing to identify an augmented image set with the closest frequency distribution is possible in various ways. For example, for each of the augmentation feature statistic and the reference feature statistic, the augmentation parameter determination section 36 creates a frequency distribution, with the size of the feature of the recognition target sorted into bins on the horizontal axis and with the number of recognition targets of each bin on the vertical axis, as shown in FIG. 6. The augmentation parameter determination section 36 then sums up absolute differences between the two frequency distributions in all of the respective bins. The augmentation parameter determination section 36 judges that a smaller sum indicates a higher similarity between the augmentation feature statistic and the reference feature statistic. Alternatively, the augmentation parameter determination section 36 may calculate an inverse of the sum as a similarity and select an augmented image set with a large value of the similarity.

As described above, the processing section 30 generates the augmented image sets by applying the data augmentation including the image resizing process to the images included in the training image set. The processing section 30 then determines the lower limit of the image resizing rate based on a similarity between each augmentation feature statistic and the reference feature statistic. The lower limit of the image resizing rate represents the limit of image size reduction in the image resizing process. This method enables determination of an appropriate augmentation parameter for reducing the size of recognition targets, and thus can improve detection accuracy for relatively small recognition targets.

Figure 7:
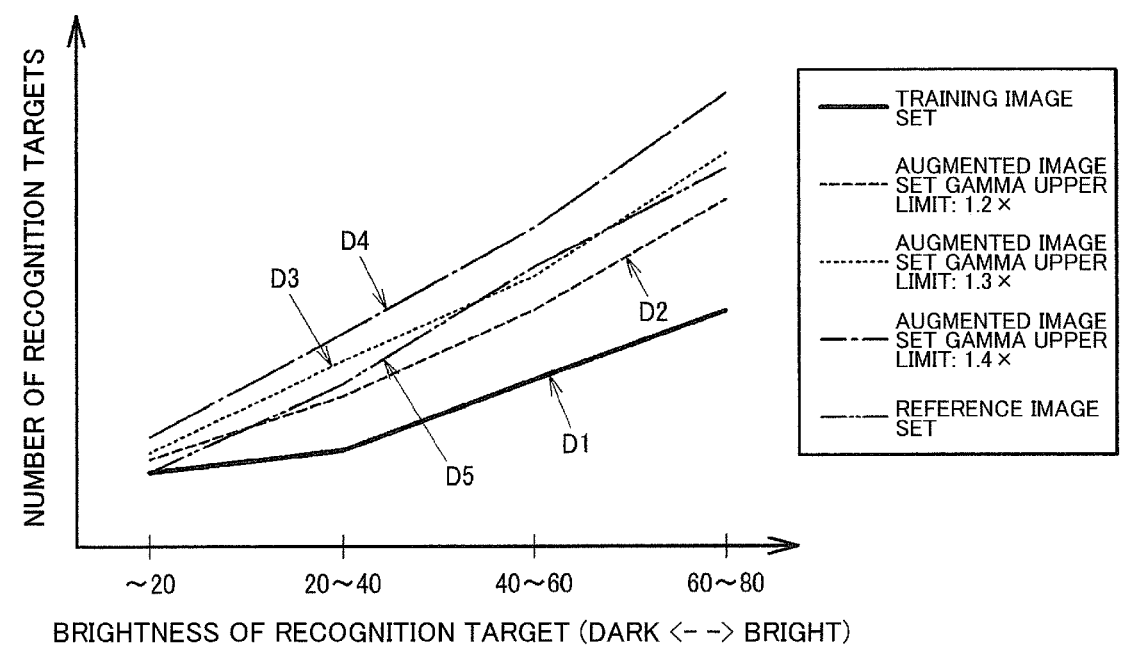
FIG. 7 illustrates an example of an augmentation feature statistic and a reference feature statistic.

FIG. 7 explains how the augmentation parameter defining the lower limit of the brightness correction is determined based on comparison between an augmentation feature statistic and a reference feature statistic about the brightness of the recognition target. In FIG. 7, the horizontal axis represents the brightness of the recognition target, as divided into four sections demarcated by 20 values in the brightness range. The brightness ranges from 0 to 255, and FIG. 7 shows a part of the range. The vertical axis in FIG. 7 represents the number of recognition targets included in each image set. It should be noted that various modifications may be made to the specific form of the frequency distribution, such as dividing the sections of FIG. 7 into the ranges of 0 to 20, 0 to 40 and so on, in which case the vertical axis in FIG. 7 represents a cumulative number of recognition targets.

In FIG. 7, the line D1 represents a feature statistic of the training image set. Since the training image set contains many bright polyps, the number of recognition targets therein tends to be small in the brightness range not more than 80.

In FIG. 7, the line D2 represents an augmentation feature statistic of an augmented image set generated by an augmentation parameter defining the upper limit of $\gamma$ in the gamma correction process at 1.2. The line D3 corresponds to an augmented image set generated with the upper limit of $\gamma$ at 1.3, and the line D4 corresponds to an augmented image set generated with the upper limit of $\gamma$ at 1.4. Since all of these upper limits of $\gamma$ are more than 1, each augmented image set contains a larger number of dark recognition targets, as compared to the training image set. For this reason, the lines D2-D4 are positioned above the line D1 in the brightness range not more than 80.

The line D5 represents a reference feature statistic of the reference image set. In this case, the line D3 is closest to the line D5 among the lines D2-D4. In other words, when the upper limit of $\gamma$ is 1.3, the feature frequency distribution of the augmented image set is closest to the feature frequency distribution of the reference image set. Hence, the augmentation parameter determination section 36 determines the lower limit of the brightness correction, namely, the upper limit of $\gamma$ to be 1.3.

As described above, the processing section 30 generates the augmented image sets by applying the data augmentation including the brightness correction process to the images included in the training image set. The processing section 30 then determines the lower limit of the brightness correction based on a similarity between each augmentation feature statistic and the reference feature statistic. The lower limit of the brightness correction represents the limit of brightness reduction in the brightness correction process. This method enables determination of an appropriate augmentation parameter for darkening recognition targets, and thus can improve detection accuracy for recognition targets captured as relatively dark images.

While the above description has been given of the size and brightness with reference to FIGS. 6 and 7, the blur amount can be dealt with in a similar manner. The processing section 30 generates augmented image sets by applying the data augmentation including the smoothing process to the images included in the training image set. The processing section 30 then determines the upper limit of the intensity of the smoothing process based on a similarity between each augmentation feature statistic and the reference feature statistic. This method enables determination of an appropriate augmentation parameter for increasing the blur degree of recognition targets, and thus can improve detection accuracy for recognition targets captured as relatively blurry images. Specifically, the blur degree is expressed in terms of the magnitude of contrast values.

The above description has been given of the case of calculating a single feature statistic based on a single feature. However, the processing by the augmentation parameter determination section 36 is not limited to this. For example, the augmentation parameter determination section 36 may calculate a statistic from a vector obtained by arranging a plurality of features of the recognition target (e.g., size and brightness, brightness and blur amount, or the like), and may calculate a similarity between each augmentation feature statistic and the reference feature statistic. Such consideration of correlation between the plurality of features allows for generation of an augmented image set that is more similar to the reference image set.

As described above, the reference image set is composed only of images corresponding to frames including a frame in which the recognition target has appeared and frames within a predetermined time period after that frame, and thus it is difficult to prepare the reference image set in large quantity. The method of the exemplary embodiment enables creation of the augmented image set having a feature distribution of the recognition target similar to that of the reference image set, based on the training image set. The training image set has no restrictions on its relationship with the frame in which the recognition target has appeared, and thus may, in a narrow sense, include images extracted from all frames.

Returning to FIG. 5, processing after the determination of the augmentation parameter will be described. At step S107, the training section 37 is trained for the image recognition processing using the augmented image set corresponding to the augmentation parameter determined by the processing at step S106. Each image included in the training image set is associated with information identifying the position of each recognition target. Thus, each image contained in the augmented image set can also be associated with information identifying the position of each recognition target. The training section 37 is trained based on the data set of the augmented image set and the information identifying the position of each recognition target. Note that the method of the exemplary embodiment is directed to determining an appropriate augmentation parameter, and thus any choice can be made for a training method using the augmented image set that is generated based on the thus determined augmentation parameter. For example, it is possible to use any of widely known training processes, such as support vector machine (SVM).

However, as widely known, data augmentation is more effective when combined with a neural network. FIG. 8A schematically explains a neural network. A neural network consists of an input layer to which data is input, an intermediate layer(s) that performs operations based on the output from the input layer, and an output layer that outputs data based on the output from the intermediate layer(s). While FIG. 8A illustrates the network including two intermediate layers, the number of intermediate layers may be one or may be more than two. Also, the number of nodes (neurons) included in each layer is not limited to that shown in FIG. 8A and may be modified in various ways. For better accuracy, deep learning using a multi-layer neural network is preferable for the training in the exemplary embodiment. The multi-layer as referred to here is four or more layers in a narrow sense.

As shown in FIG. 8A, a node included in a given layer is connected to nodes in an adjacent layer(s). Each connection between the nodes is weighted. Each node multiplies every output from the preceding nodes by their weights and sums the products. Each node further adds a bias to the sum and applies an activation function to the addition result to generate its output. This processing is sequentially performed from the input layer to the output layer, generating an output from the neural network. What is learned by the neural network is the process of determining appropriate weights (including biases). The exemplary embodiment can generally apply various known training methods, including backpropagation.

More specifically, the training section 37 may employ a convolutional neural network (CNN) for the image recognition processing. FIG. 8B schematically explains a CNN. The CNN includes convolutional layers that perform a convolution operation and pooling layers. Each convolutional layer performs a filter process. Each pooling layer performs a pooling operation for reducing the size in the vertical direction and the horizontal direction. FIG. 8B illustrates a network that generates an output through alternate operations of two convolutional layers and two pooling layers, followed by an operation of a convolutional layer. The output may also be generated through an operation of a fully connected layer. The fully connected layer is a layer for performing an operation when all nodes in a preceding layer are connected to a node in a given layer, which corresponds to the operation of each layer as explained with reference to FIG. 8A. FIG. 8B omits illustration of an operation using an activation function. The specific configuration of the CNN may be modified in various ways, such as using three or more convolutional layers. The weight of each convolutional layer in the CNN is a filter parameter. In other words, the training by the CNN includes training of filters used for convolution operations. Since the neural network, including the CNN, is a widely known method, further description thereof is omitted.

As described above, the processing section 30 generates a plurality of augmented image sets by applying the data augmentation to the images included in the training image set, the data augmentation being determined based on a plurality of candidate augmentation parameters having different parameter values. Based on the plurality of augmented image sets, the processing section 30 calculates a plurality of augmentation feature statistics, and thereafter identifies, from among the plurality of augmentation feature statistics, an augmentation feature statistic with the highest similarity to the reference feature statistic. The processing section 30 then determines, from among the plurality of candidate augmentation parameters having the different parameter values, the candidate augmentation parameter corresponding to the identified augmentation feature statistic as the augmentation parameter used for data augmentation.

When there is a plurality of candidate augmentation parameters, this method enables judgment of a similarity between the reference image set and each augmented image set which is actually generated based on each candidate augmentation parameter. This method can thus appropriately judge the most appropriate candidate augmentation parameter from among the plurality of candidate augmentation parameters.

The method of the exemplary embodiment is applicable to a trained model generated by training in the training section 37. The trained model of the exemplary embodiment causes a computer to receive applied images as input, detect recognition targets in the applied images, and output the detection results. The trained model is trained in the following manner: (i) generating an augmented image set by applying data augmentation to images included in the training image set, the data augmentation being determined based on a candidate augmentation parameter that is a candidate for an augmentation parameter; (ii) calculating an augmentation feature statistic based on the augmented image set, the augmentation feature statistic being a statistic of a feature of a recognition target; (iii) calculating a reference feature statistic based on the reference image set, the reference feature statistic being a statistic of a feature of the recognition target; (iv) determining the augmentation parameter based on a similarity between the augmentation feature statistic and the reference feature statistic; and (v) training the model using the augmented image set generated based on the thus determined augmentation parameter.

The trained model may be a model corresponding to a neural network, for example. That is, the trained model may be a neural network consisting of an input layer that receives input of applied images, an intermediate layer(s) that carries out operations based on the output from the input layer, and an output layer that outputs the results of detection of recognition targets in the applied images based on the output from the intermediate layer(s). Weights in the neural network are determined through the training process using the augmented image set generated by the augmentation parameter based on the aforementioned method.

The method of the exemplary embodiment is also applicable to an image processing method of executing the steps shown in FIG. 5 or steps shown in FIG. 9 (described later). The image processing method includes a training image set acquisition step, an augmented image set generation step, an augmentation feature statistic calculation step, a reference image set acquisition step, a reference feature statistic calculation step, and an augmentation parameter determination step. The training image set acquisition step is a step of acquiring a training image set. The augmented image set generation step is a step of generating an augmented image set by applying data augmentation to the images included in the training image set, the data augmentation being determined based on a candidate augmentation parameter that is a candidate for an augmentation parameter. The augmentation feature statistic calculation step is a step of calculating an augmentation feature statistic based on the augmented image set, the augmentation feature statistic being a statistic of a feature of the recognition target. The reference image set acquisition step is a step of acquiring the reference image set. The reference feature statistic calculation step is a step of calculating a reference feature statistic based on the reference image set, the reference feature statistic being a statistic of a feature of the recognition target. The augmentation parameter determination step is a step of determining the augmentation parameter based on a similarity between the augmentation feature statistic and the reference feature statistic.

4. Modifications

In the above example described with reference to FIG. 5, the processing section 30 generates a plurality of augmented image sets in advance, and selects one of the augmented image sets using the reference image set. Advantageously, this processing allows for easy selection of the most appropriate augmentation parameter because it enables generation of augmented image sets and comparison of augmentation feature statistics with the reference feature statistic for, e.g., all possible candidate augmentation parameters. On the other hand, this processing needs to generate a large number of augmented image sets and thus involves a large processing load, which may occupy a considerable part of the memory capacity.

Figure 9:
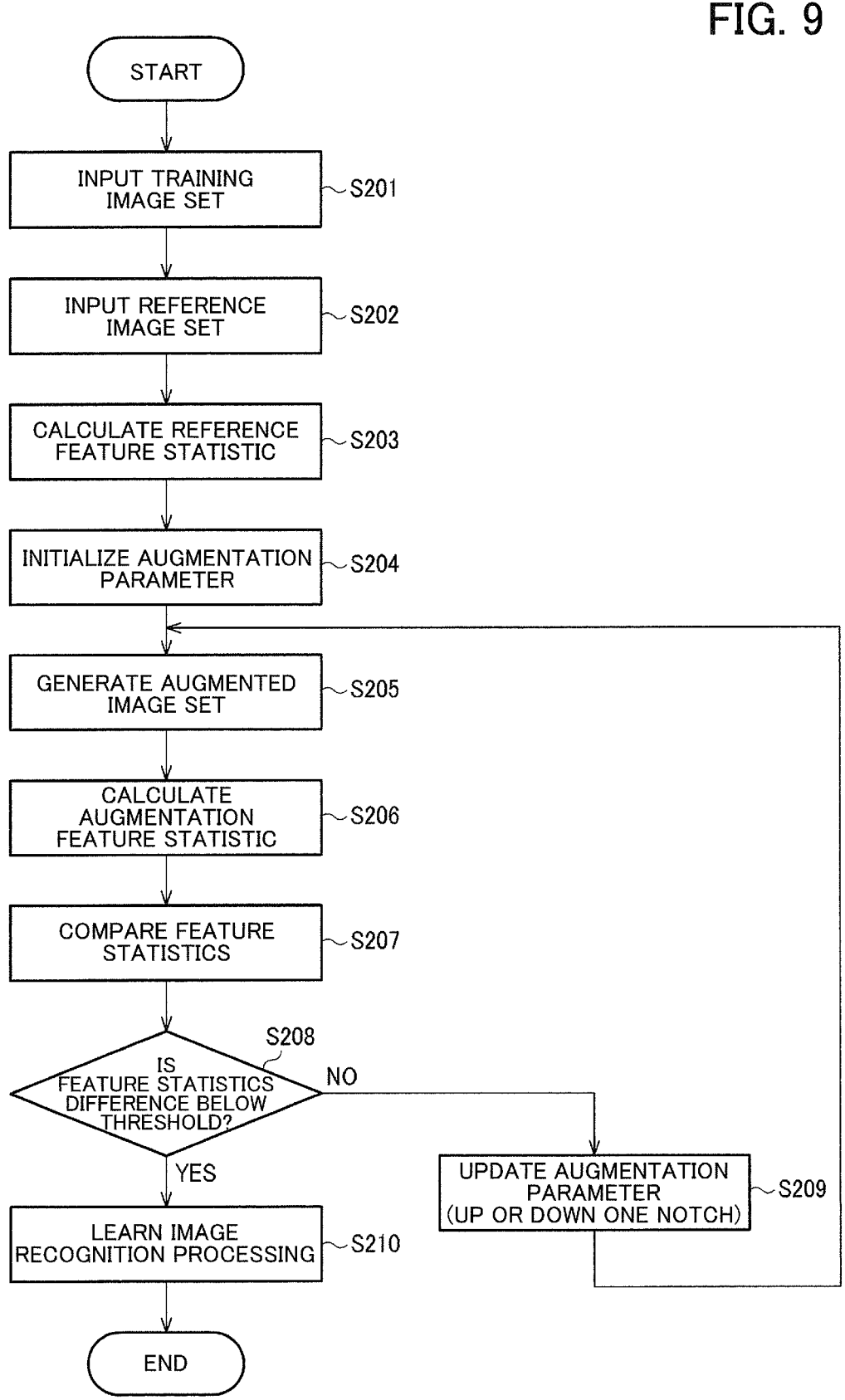
FIG. 9 is another flowchart of processing in accordance with the exemplary embodiment.

FIG. 9 is a flowchart of processing by the processing section 30 in another example. The steps of receiving input of the training image set (step S201), receiving input of the reference image set (step S202), and calculating a reference feature statistic (step S203) are similar to steps S101, S104, and S105, respectively, in FIG. 5.

The augmented image set generation section 32 initializes an augmentation parameter with a given value (step S204). In other words, the augmented image set generation section 32 selects one of the plurality of candidate augmentation parameters and sets a parameter value of the selected candidate augmentation parameter to an initial value. The augmented image set generation section 32 then applies data augmentation based on the initialized augmentation parameter to the training image set to generate an augmented image set (step S205). At step S205, the augmented image set generation section 32 generates a smaller number of augmented image sets than the number of candidate augmentation parameters, namely, generating a single augmented image set in a narrow sense.

At step S206, the augmentation feature statistic calculation section 33 calculates an augmentation feature statistic based on the augmented image set generated at step S205. At step S207, the augmentation parameter determination section 36 compares the reference feature statistic calculated at step S203 with the augmentation feature statistic calculated at step S206.

The augmentation parameter determination section 36 judges whether a difference between the reference feature statistic and the augmentation feature statistic is below a given threshold (step S208). The difference between the feature statistics refers to the sum of absolute differences in the respective sections in FIG. 6 or FIG. 7, for example. The processing at step S208 may be regarded as the processing to judge whether a similarity between the reference feature statistic and the augmentation feature statistic is low or not.

If the difference is at or above the threshold (No at step S208), which means that the feature of the recognition target in the augmented image set is deviated from that of the recognition target in the reference image set, the augmentation parameter determination section 36 judges that the augmented image set is unsuitable for training. Thus, the augmentation parameter determination section 36 updates the augmentation parameter (step S209). When the augmentation parameter in question is about the lower limit of the image resizing rate, the augmentation parameter determination section 36 changes the lower limit value by one notch. In the example shown in FIG. 6, the one-notch change means an increase or decrease in the image resizing rate by 0.1. As has been described above with reference to FIGS. 6 and 7, a direction of changing the feature statistic in response to a change in the augmentation parameter is already known. That is, by judging which of the augmentation feature statistic and the reference feature statistic is larger than the other while performing the comparison at step S207, the augmentation parameter determination section 36 can determine an appropriate direction of changing the augmentation parameter. Put another way, the process of updating the augmentation parameter is a process of selecting another candidate augmentation parameter from the plurality of candidate augmentation parameters.

The process of updating the augmentation parameter is followed by the steps of generating an augmented image set (step S205), calculating an augmentation feature statistic (step S206), comparing the augmentation feature statistic with the reference feature statistic (step S207), and judging a difference between these feature statistics (step S208). In other words, the process of updating the augmentation parameter is repeated until a positive judgment is made at step S208.

If the difference is below the threshold (Yes at step S208), the feature of the recognition target in the augmented image set is considered to be sufficiently similar to that of the recognition target in the reference image set. Hence, at step S210, the training section 37 is trained for the image recognition processing using the augmented image set generated at latest step S205.

As described above, the processing section 30 generates the augmented image set by applying the data augmentation to the images included in the training image set, the data augmentation being determined based on the candidate augmentation parameter having a given parameter value. The processing section 30 calculates the augmentation feature statistic based on the augmented image set. If the similarity between the augmentation feature statistic and the reference feature statistic is judged high, the processing section 30 determines the candidate augmentation parameter having the given parameter value as the augmentation parameter used for the data augmentation. On the other hand, if the similarity between the augmentation feature statistic and the reference feature statistic is judged low, the processing section 30 updates the parameter value. The process of judging the degree of similarity is more specifically the process of performing comparison with a given threshold, as illustrated at step S208.

This method eliminates the need for generating a large number of augmented image sets at a time, enabling efficient searching for an appropriate augmentation parameter.

5. Image Processing System as a Detection Device

The above description has been given of the image processing system 10 that performs the generation process of generating an augmented image set based on an appropriate augmentation parameter and the training process based on the augmented image set. In other words, the image processing system 10 described above is a system corresponding to a training device used in training phases. Additionally, the method of the exemplary embodiment may be applied to the image processing system 10 that performs a process of detecting recognition targets based on the training results. In this case, the image processing system 10 is a system corresponding to a detection device.

Figure 10:
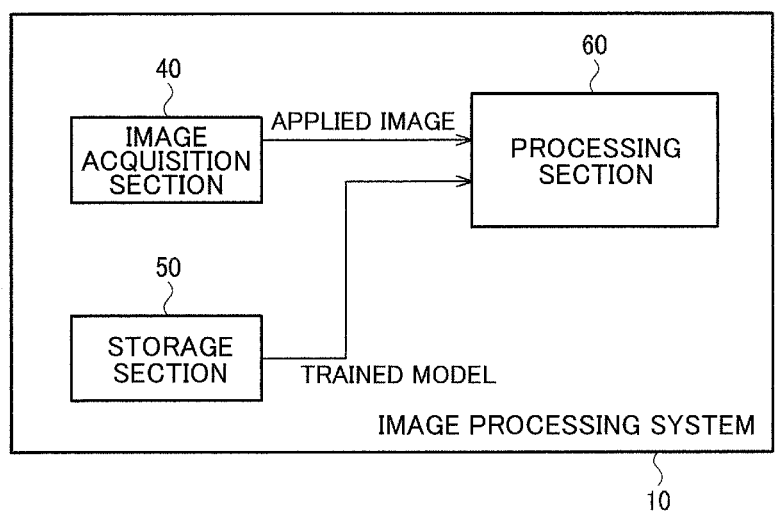
FIG. 10 illustrates a configuration example of the image processing system configured to detect recognition targets.

FIG. 10 illustrates another configuration example of the image processing system 10. The image processing system 10 includes an image acquisition section 40, a storage section 50, and a processing section 60. The image acquisition section 40 acquires applied images. The storage section 50 stores a trained model. The trained model is used as a program module being a part of artificial intelligence software. The processing section 60 processes the applied images based on the trained model to detect recognition targets. In other words, the processing section 60 is operative to output the results of detection of recognition targets in the input applied images, in accordance with the instructions from the trained model stored in the storage section 50. The processing section 60 is implemented by any of various kinds of hardware and software, similarly to the processing section 30. The storage section 50 may, similarly to the storage section 20, be a semiconductor memory, a register, a magnetic storage device, or an optical storage device. The processing section 60 may include dedicated hardware for processing based on the trained model. In the case of using a neural network, the processing section 60 may include a circuit device to perform a filter process in a convolution operation and a product-sum operation process in a fully connected layer. For example, the circuit device may be implemented as a field-programmable gate array (FPGA), etc. For detection of recognition targets in this case, the storage section 50 stores parameters representing weights as the trained model, and the processing section 60, including the above circuit device, is operative according to the weights. Alternatively, the storage section 50 may store not only a program for execution of a filter process and a product-sum operation process but also the above weights as the trained model. As such, the specific configuration for enabling the processing section 60 to operate according to the instructions from the trained model stored in the storage section 50 may be modified in various ways.

Also, the image processing system 10 corresponding to the detection device may consist of a single device or multiple devices. For example, the image processing system 10 may be implemented by cooperation of a terminal device, such as a PC, and a server system. The storage section 50 may be a ROM or a RAM. Specifically, the trained model written into the storage section 50 may or may not be rewritable. In the case where the trained model is rewritable, for example, information about the trained model is aggregated in a server system, and the storage section 50 of the image processing system 10 acquires the trained model from the server system and stores it. This configuration allows the trained model to be managed by the server system, and hence facilitates updates and other processing.

The trained model stored in the storage section 50 has been trained using the augmented image set that is generated by applying data augmentation determined by the augmentation parameter to the training image set. The augmentation parameter is determined such that the feature of the recognition target in the augmented image set is close to that of the recognition target in the reference image set that is a collection of images acquired in environments corresponding to the environment in which the applied images are acquired.

More specifically, the trained model is trained by executing the above steps in FIG. 5 or FIG. 9. These steps include: the step of generating an augmented image set generated by applying data augmentation to the images included in the training image set, the data augmentation determined based on a candidate augmentation parameter that is a candidate for an augmentation parameter; the step of calculating an augmentation feature statistic based on the augmented image set, the augmentation feature statistic being a statistic of a feature of the recognition target; the step of calculating a reference feature statistic based on the reference image set, the reference feature statistic being a statistic of a feature of the recognition target; the step of determining the augmentation parameter based on a similarity between the augmentation feature statistic and the reference feature statistic; and the step of performing training based on the augmented image set generated by the determined augmentation parameter.

This method enables the process of detecting recognition targets, using the trained model that has been trained with the augmented image set containing images of the recognition targets whose feature is similar to that of the recognition targets contained in the reference image set. As the environments assumed for the training are similar to detection environments, this method enables highly accurate detection of the recognition targets. More specifically, this method enables highly accurate detection of the recognition targets immediately after their appearance.

The program for implementing the processes performed by the image processing system 10 of the exemplary embodiment may be, for example, stored in an information storage device that is a computer-readable medium. The program as referred to here includes the trained model. The information storage device may be implemented, for example, as an optical disk, a memory card, a hard disk drive (HDD), or a semiconductor memory. The processing section 60 performs various processes including detection of the recognition targets based on the program stored in the information storage device. That is, the information storage device stores the program for causing a computer to function as the image processing system 10. The computer is a device including an input device, a processing section, a storage section, and an output section. The program causes the computer to execute the processes in the image processing system 10, particularly the processes in the processing section 60.

The applied images are in-vivo images capturing an interior of living bodies. The recognition target may be an object of interest captured in the in-vivo images. The object of interest refers to an object with relatively higher observation priority for a user than the other objects. For example, in the case where the user is a physician and wants to perform treatment, the object of interest is a mucosal area or a lesion area. The object of interest may be a polyp as described above. Alternatively, in the case where the physician wants to observe bubbles and feces, the object of interest is such bubbles and feces. As such, the object of interest for a user differs depending on the purposes of observation. In any case, the object of interest refers to an object with relatively higher observation priority in user's observation than the other objects. This allows the object of interest, which is the recognition target, to be detected with high accuracy during observation of in-vivo images. In this case, the image processing system 10 may be an endoscope apparatus capturing in-vivo images.

Figure 11:
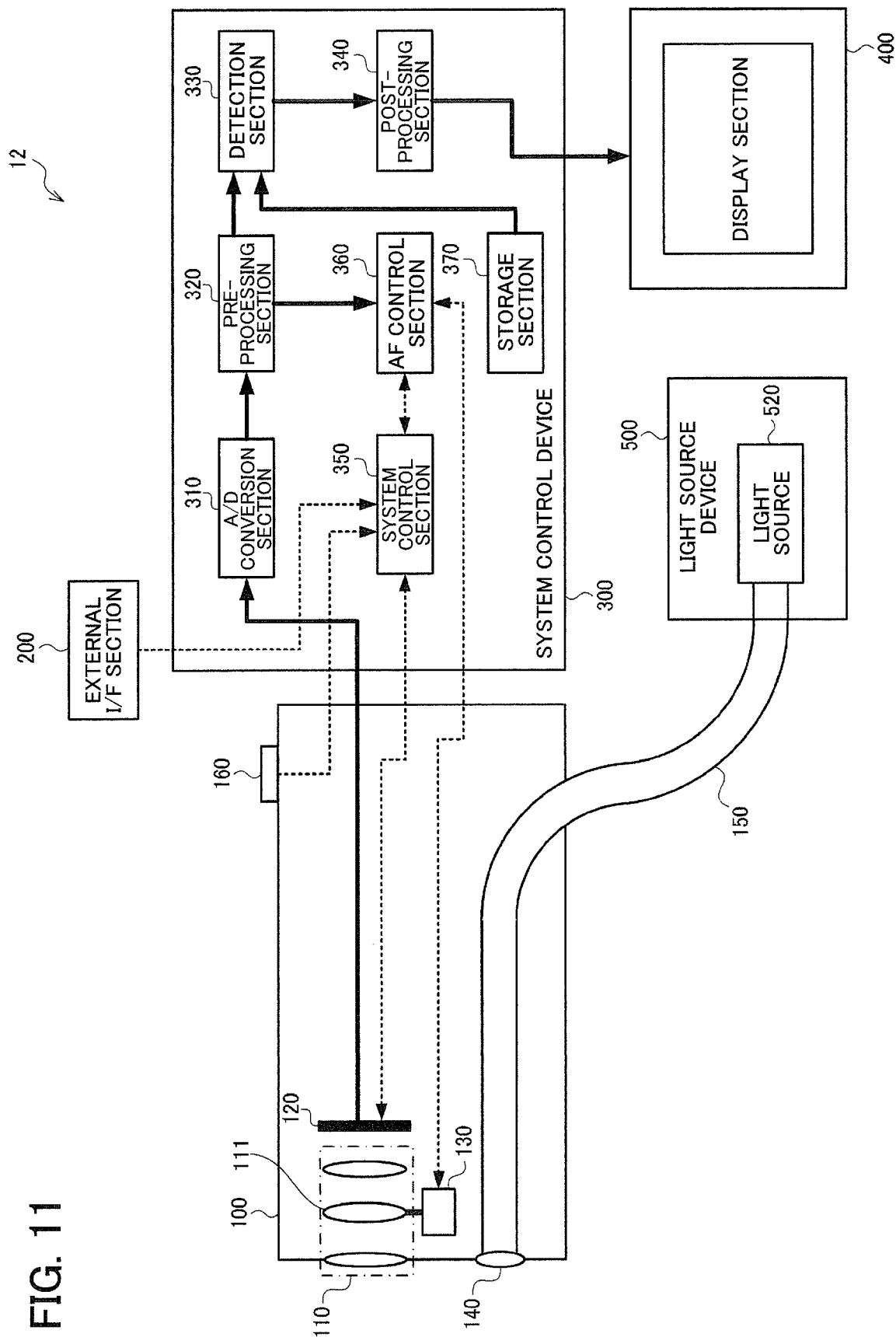
FIG. 11 illustrates a configuration example of an endoscope apparatus including the image processing system.

FIG. 11 illustrates a configuration example of an endoscope apparatus 12. The endoscope apparatus 12 includes an insertion section 100, an external I/F section 200, a system control device 300, a display section 400, and a light source device 500.

The insertion section 100 is a portion inserted into a living body. The insertion section 100 includes an objective optical system 110, an image sensor 120, an actuator 130, an illumination lens 140, a light guide 150, and an auto focus (AF) start/stop button 160.

The light guide 150 guides illumination light emitted from a light source 520 to a distal end of the insertion section 100. The illumination lens 140 illuminates an object with the illumination light guided by the light guide 150. The objective optical system 110 forms an image of reflected light from the object as an object image. The objective optical system 110 includes a focus lens 111. A position at which the object image is formed can be changed according to a position of the focus lens 111. The actuator 130 drives the focus lens 111 based on instructions from an AF control section 360. It should be noted that the AF function is not an essential element and the endoscope apparatus 12 may be configured without the AF control section 360.

The image sensor 120 receives light from the object via the objective optical system 110. The image sensor 120 may be either a monochrome sensor or a sensor including a color filter. The color filter may be a commonly known Bayer filter, a complementary color filter, or any other filter. The complementary color filter is a filter including cyan, magenta, and yellow filters.

The AF start/stop button 160 is an interface that allows a user to start/stop the AF function. The external I/F section 200 is an interface that allows a user to give inputs to the endoscope apparatus 12. For example, the external I/F section 200 includes buttons for setting an AF control mode, setting an AF region, and adjusting image processing parameters.

The system control device 300 performs image processing and controls the entire system. The system control device 300 includes an A/D conversion section 310, a preprocessing section 320, a detection section 330, a postprocessing section 340, a system control section 350, the AF control section 360, and a storage section 370. The system control device 300 includes the image processing system 10 in FIG. 10. The A/D conversion section 310 corresponds to the image acquisition section 40 in FIG. 10. The storage section 370 corresponds to the storage section 50 in FIG. 10. The sections including the preprocessing section 320, the detection section 330, and the postprocessing section 340 correspond to the processing section 60 in FIG. 10.

The A/D conversion section 310 converts analog signals sequentially output from the image sensor 120 into digital images, and sequentially outputs the converted images to the preprocessing section 320. The preprocessing section 320 performs various correction processes on the captured images sequentially output from the A/D conversion section 310, and sequentially outputs the corrected images to the detection section 330 and the AF control section 360. For example, the correction processes include a white balance process, a noise reduction process, and the like.

The detection section 330 operates according to the trained model stored in the storage section 370 to detect recognition targets in the captured images, which are the applied images. In the case where the trained model is a neural network, the detection section 330 performs forward-direction operations on the input applied images using the weights determined through training. The detection section 330 then outputs the results of detection of the recognition targets, based on the output from the output layer. In detecting a recognition target, it is important to judge the presence or absence of the recognition target, but it is also important to identify its position in an image. Various methods are known to detect an object along with its position. For example, the detection section 330 may detect recognition targets by first extracting a plurality of candidate regions from the applied images and then performing a classification process on each candidate region. Alternatively, the detection section 330 may detect recognition targets by extracting a plurality of candidate regions from the applied images and performing a classification process on each candidate region, simultaneously by a single neural network. Still alternatively, the neural network may be trained to classify pixels of the applied images into classes; in this case, the output layer outputs the results of classification as to whether each pixel of the applied images is a recognition target or not.

The postprocessing section 340 performs postprocessing based on the results of the detection process by the detection section 330, and outputs the postprocessed images to the display section 400. The postprocessing may include various processes, such as highlighting the recognition targets in the applied images and appending information representing the detection results.

The system control section 350 is connected to the image sensor 120, the AF start/stop button 160, the external I/F section 200, and the AF control section 360 to control these components. Specifically, the system control section 350 exchanges various control signals with these components. The AF control section 360 performs AF control using the applied images sequentially output from the preprocessing section 320.

The display section 400 sequentially displays the images output from the postprocessing section 340. For example, the display section 400 is a liquid crystal display or an electro-luminescence (EL) display, etc. The light source device 500 includes the light source 520 emitting illumination light. The light source 520 may be a xenon light source, a light emitting diode (LED), or a laser light source. The light source 520 may be any other light source and, as such, is not limited to a particular light emission technique.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. An image processing system comprising:
   a memory storing a training image set and a reference image set; and
   a processor including hardware, wherein the processor is configured to:
   performing a determination process comprising:
      generate an augmented image set of endoscope images by applying data augmentation, including one or more of an image resizing process, a brightness correction process and a smoothing process, to image data of endoscope images included in the training image set, the data augmentation being applied based on a candidate augmentation parameter on the one or more of the image resizing process, the brightness correction process and the smoothing process, that is a candidate for an augmentation parameter;
      calculate an augmentation feature statistic based on the augmented image set, the augmentation feature statistic being a statistic of a feature of one or more pixels in the endoscope images of the augmented image set representing a recognition target in the endoscope images of the augmented image set;
      calculate a reference feature statistic based on the reference image set, the reference feature statistic being a statistic of the feature of one or more pixels in endoscope images of the reference image set representing the recognition target in the endoscope images of the reference image set; and
      determine whether the augmentation feature statistic and the reference feature statistic have a predefined similarity;
   repeat the determination process with an incremented candidate augmentation parameter as the candidate for the augmentation parameter until the augmentation feature statistic of one of the augmented image sets generated based on the candidate augmentation parameter and the incremented candidate augmentation parameters and the reference feature statistic has the predefined similarity; and
   generate a trained model for image recognition process based on the endoscope images of the augmented image set having the augmentation parameter that has the predefined similarity with the reference feature statistic.

2. The image processing system as defined in claim 1, wherein the reference image set includes at least one endoscope image among the endoscope images corresponding to frames including a frame in which the recognition target has appeared and frames within a predetermined time period after the frame.

3. The image processing system as defined in claim 2, wherein the endoscope images of the reference image set include images obtained by capturing an interior of a tubular structure.

4. The image processing system as defined in claim 1, wherein the processor is configured to repeat the determination process a predetermined number of times, and
wherein the predefined similarity is determined based on one of the candidate augmentation parameter and the one or more incremented candidate augmentation parameters used in the repeated determination process has a corresponding augmentation feature statistic with a highest similarity to the reference feature statistic.

5. The image processing system as defined in claim 1, wherein the recognition target in an endoscope image included in the endoscope images of the reference image set is an object of interest positioned in a peripheral area in the endoscope image.

6. The image processing system as defined in claim 1, wherein the data augmentation includes the image resizing process, and
wherein the augmentation parameter that has the predefined similarity with the reference feature statistic is a lower limit of an image resizing rate based on the similarity between the augmentation feature statistic and the reference feature statistic, the lower limit of the image resizing rate representing a limit to image size reduction in the image resizing process.

7. The image processing system as defined in claim 1, wherein the data augmentation includes the brightness correction process, and
wherein the augmentation parameter that has the predefined similarity with the reference feature statistic is a lower limit of brightness correction based on the similarity between the augmentation feature statistic and the reference feature statistic, the lower limit of the brightness correction representing a limit to brightness reduction in the brightness correction process.

8. The image processing system as defined in claim 1, wherein the data augmentation includes the smoothing process, and
wherein the augmentation parameter that has the predefined similarity with the reference feature statistic is an upper limit of intensity of the smoothing process based on the similarity between the augmentation feature statistic and the reference feature statistic.

9. The image processing system as defined in claim 1, wherein the processor is configured to use at least one of a size, brightness, and a blur amount of the recognition target, as the feature of the recognition target.

10. The image processing system as defined in claim 1, wherein the processor is configured to use at least one of a frequency distribution, a mean value, a variance, a maximum value, a minimum value, and a higher-order moment of the feature of the recognition target, as the statistic of the feature of the recognition target.

11. The image processing system as defined in claim 1, wherein the processor is configured to generate the trained model through machine learning based on the endoscope images of the augmented image set having the augmentation parameter that has the predefined similarity with the reference feature statistic.

12. An image detection system comprising:
a memory storing the trained model generated by the image processing system according to claim 1; and
a processor including hardware, wherein the processor is configured to detect the recognition target in an acquired applied endoscope image by performing processing thereon based on the trained model.

13. The image detection system as defined in claim 12, wherein the applied image is an in-vivo endoscope image capturing an interior of a living body, and
wherein the recognition target is an object of interest captured in the in-vivo endoscope image.

14. An image processing method comprising:
acquiring a training image set and a reference image set;
performing a determination process comprising:
  generating an augmented image set of endoscope images by applying data augmentation, including one or more of an image resizing process, a brightness correction process and a smoothing process, to image data of endoscope images included in the training image set, the data augmentation being applied based on a candidate augmentation parameter on the one or more of the image resizing process, the brightness correction process and the smoothing process, that is a candidate for an augmentation parameter;
  calculating an augmentation feature statistic based on the augmented image set, the augmentation feature statistic being a statistic of a feature of one or more pixels in the endoscope images of the augmented image set representing a recognition target in the endoscope images of the augmented image set;
  calculating a reference feature statistic based on the reference image set, the reference feature statistic being a statistic of the feature of one or more pixels in endoscope images of the reference image set representing the recognition target in the endoscope images of the reference image set; and
  determining whether the augmentation feature statistic and the reference feature statistic has a predefined similarity;
repeating the determination process with an incremented candidate augmentation parameter as the candidate for the augmentation parameter until the augmentation feature statistic of one of the augmented image sets generated based on the candidate augmentation parameter and the incremented candidate augmentation parameters and the reference feature statistic has the predefined similarity; and
generating a trained model for image recognition process based on the endoscope image of the augmented image set having the augmentation parameter that has the predefined similarity with the reference feature statistic.

15. An image detection system comprising:
a processor including hardware, wherein the processor is configured:
  receive an acquired endoscope image; and
  detect the recognition target in the acquired endoscope image based on the trained model generated by the image processing system according to claim 1.

* * * * *